(12) United States Patent
Furlan et al.

(10) Patent No.: US 7,362,020 B2
(45) Date of Patent: Apr. 22, 2008

(54) COMMUTATOR HOUSING WITH AN OVERCURRENT PROTECTION DEVICE

(75) Inventors: Franck Furlan, Ussy (FR); Stephane De Zutter, Culey le Patry (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 126 days.

(21) Appl. No.: 11/244,307

(22) Filed: Oct. 5, 2005

(65) Prior Publication Data

US 2006/0076848 A1    Apr. 13, 2006

(30) Foreign Application Priority Data

Oct. 8, 2004    (FR)    ................................ 04 10645

(51) Int. Cl.
*H02K 7/00*    (2006.01)
(52) U.S. Cl. .................. 310/71; 310/68 C; 310/233
(58) Field of Classification Search .............. 310/68 C, 310/71, 233, 239; 361/23–24, 31–32; 439/374, 439/211, 857, 848, 849
See application file for complete search history.

(56) References Cited

U.S. PATENT DOCUMENTS

| | | | | |
|---|---|---|---|---|
| 4,061,935 A | * | 12/1977 | Kandpal | .................. 310/68 C |
| 4,593,220 A | * | 6/1986 | Cousins et al. | ............. 310/239 |
| 5,373,209 A | * | 12/1994 | Strobl et al. | ................. 310/234 |
| 6,452,297 B2 | * | 9/2002 | Yamamoto et al. | ........... 310/89 |
| 6,568,943 B2 | * | 5/2003 | Okayasu et al. | ........... 439/76.1 |
| 6,653,754 B2 | * | 11/2003 | Uchida et al. | ................. 310/51 |
| 6,677,693 B2 | * | 1/2004 | Ooyama | ..................... 310/239 |
| 7,121,855 B1 | * | 10/2006 | Su | .............................. 439/188 |
| 2001/0022475 A1 | * | 9/2001 | Uchida et al. | ............ 310/68 C |
| 2003/0173843 A1 | | 9/2003 | Sakai et al. | |
| 2004/0012295 A1 | | 1/2004 | Takahashi et al. | |
| 2004/0012296 A1 | * | 1/2004 | Sakai et al. | ................. 310/239 |
| 2004/0195928 A1 | * | 10/2004 | Skofljanec | .................. 310/239 |
| 2005/0000721 A1 | * | 1/2005 | Muller | ....................... 174/84 C |
| 2005/0264126 A1 | * | 12/2005 | Lee | .............................. 310/234 |
| 2006/0141827 A1 | * | 6/2006 | Auray et al. | ................... 439/92 |

FOREIGN PATENT DOCUMENTS

DE    26 05 087    8/1977
EP    0 306 765    3/1989

* cited by examiner

*Primary Examiner*—Dang Le
(74) *Attorney, Agent, or Firm*—Carlson, Gaskey & Olds

(57) ABSTRACT

A commutator housing for a direct-current motor includes conductive tracks and two Lyre-shaped connectors each inserted in one of the conductive tracks. An overcurrent protection device is inserted in series in the conductive tracks, and electrical connection pins of the overcurrent protection device are fitted into and retained between rods of the Lyre-shaped connectors. The overcurrent protection device is attached to the commutator housing without soldering.

13 Claims, 1 Drawing Sheet

US 7,362,020 B2

COMMUTATOR HOUSING WITH AN OVERCURRENT PROTECTION DEVICE

REFERENCE TO RELATED APPLICATION

This application claims priority to French Patent Application FR 04 10 645 filed on Oct. 8, 2004.

BACKGROUND OF THE INVENTION

This invention relates generally to a commutator housing for an electric motor including an overcurrent protection device and a method for producing the commutator housing. In particular, the invention relates to an electric motor designed to drive automobile equipment, such as a vehicle window regulator, sunroof or seat operation actuator.

A commutator usually includes a commutator ring having a series of conductive segments around its circumference. The commutator ring is designed to be mounted integrally with a rotor shaft. An electric motor generally includes a stator frame and a rotor mounted rotatably in the stator. The motor also includes windings integral with the rotor shaft, and each winding is electrically connected to two diametrically opposed segments of the commutator.

The commutator is generally mounted in a commutator housing integral with the stator. The commutator housing includes a support having a central opening designed to receive the commutator and to allow the rotor shaft to pass through the housing support. The support is made of an insulating material, such as plastic. The commutator housing also includes at least one pair of brush holders, diametrically opposite the commutator, which are designed to receive brushes to make contact with the segments of the commutator during rotation with the rotor shaft. The brushes are electrically connected to an electrical power supply.

Generally, one of the brush holders is directly connected via a connection track to a pin of a power supply connector, while at least one other brush holder is connected to another pin of the power supply connector via an overcurrent protection device. The overcurrent protection device is intended to protect the brushes from possible overheating due, for example, to excess current or extreme weather conditions.

Such an overcurrent protection device may include heat dissipating transistors, a conductive chemical compound or a stacked structure. For example, a heat protection device can be produced using chemical compounds extruded and placed between two sheets of nickel which are then cut out. Iron/copper electrodes are added to the cut out sheets to adjust transfer time of the overcurrent protection device to a desired value.

The overcurrent protection device is generally mounted on the commutator housing by soldering it into a conductive line or track. There is a break in the conductive track, and tabs are soldered at each end of the break in the conductive track. The tabs at the break in the track are generally installed by the supplier of the commutator housing. The commutator housing can be placed directly on a printed circuit board provided with brush holders and tabs to receive the overcurrent protection device. The overcurrent protection device is then soldered to these tabs to form a series component in the conductive track that connects one of the brush holders to one of the power supply pins. Electrical continuity between the brush and the power supply connector is ensured via the overcurrent protection device, which can effectively limit or dissipate overheating of the system without interrupting electrical conduction.

Soldering the overcurrent protection device into a conductive track requires the use of soldering equipment to assemble the commutator housing.

A need exists for a commutator housing equipped with an overcurrent protection device that can be assembled onto the commutator housing without requiring a soldering stage, allowing for the elimination of the soldering equipment from the commutator housing assembly process.

SUMMARY OF THE INVENTION

The invention provides a commutator housing for a direct-current motor including conductive tracks providing electrical connection and a first Lyre-shaped connector and a second Lyre-shaped connector inserted in the conductive tracks. The commutator housing also includes an overcurrent protection device inserted in series in the conductive tracks and having a first electrical connection pin and a second electrical connection pin. The first connection pin is inserted into the first Lyre-shaped connector, and the second connection pin is inserted into the second Lyre-shaped connector.

According to one embodiment, each electrical connection pin of the overcurrent protection device includes cavities adapted to each receive button portions of the first and second Lyre-shaped connectors. The cavities in the electrical connection pins of the overcurrent protection device can be through-holes.

According to one embodiment, the commutator housing includes a retainer member for laterally retaining the overcurrent protection device. According to another embodiment, the commutator housing includes a retaining stop member capable of holding the overcurrent protection device in position when the first and second electrical connection pins are inserted into the first and second Lyre-shaped connectors. According to one embodiment, the conductive tracks provide electrical connection and connect brush holders to a power supply connector.

The invention also provides an operating motor for an openable component of an automobile vehicle including a commutator housing according to the invention. According to one embodiment, the commutator housing includes a support that is a printed circuit board.

The invention also provides a method for producing a commutator housing for a direct-current motor. The method includes the steps of producing conductive tracks that provide an electrical connection on a support, fitting a Lyre-shaped connector on at least one electrical conductive track, and mounting an overcurrent protection device by inserting electrical connection pins into the Lyre-shaped connector. According to one embodiment, the overcurrent protection device is fitted without soldering.

Other characteristics and advantages of the invention will become apparent when reading the following detailed description of the embodiments of the invention, given by way of example only and with reference to the drawings.

DETAILED DESCRIPTION OF PREFFERED EMBODIMENTS

The commutator housing according to the invention includes conductive tracks providing electrical connection, for example connecting brush holders to a power supply connector. Two Lyre-shaped connectors are each inserted in one of the conductive tracks, providing electrical connection. The Lyre-shaped connectors include dual cantilevered spring contacts forming a clamp. The conductive track can be interrupted between the Lyre-shaped connectors. An overcurrent protection device is inserted in series in the conductive tracks, providing electrical connection. The electrical connection pins of the overcurrent protection device are inserted into the Lyre-shaped connectors. The Lyre-shaped connectors enable electrical connection by clamping the electrical connection pins of the overcurrent protection device between two sprung cantilevered rods of each of the Lyre-shaped connectors.

The Lyre-shaped connectors are inserted on the path of the conductive tracks, i.e., on the path in which the electrical current flows between the power supply connector and a brush in contact with the commutator. The overcurrent protection device is secured to one of the conductive tracks of the commutator housing by inserting the electrical connections pins into the Lyre-shaped connectors. The overcurrent protection device is thus attached to the commutator housing without soldering. It can optionally be delivered separate from the commutator housing and attached subsequently.

An overcurrent protection device 10 for mounting on a commutator housing according to the invention will be described with reference to FIG. 1. The overcurrent protection device 10, with a technology based on transistors, chemical compounds or a stacked metallic structure, has first and second electrical connection pins 11. The electrical connection pins 11 are designed to make contact with electrical tracks to which the overcurrent protection device 10 must be connected. According to one method from the prior art, the electrical connection pins 11 were bent and soldered onto the fitted tabs of an electrical track.

Figure 1:
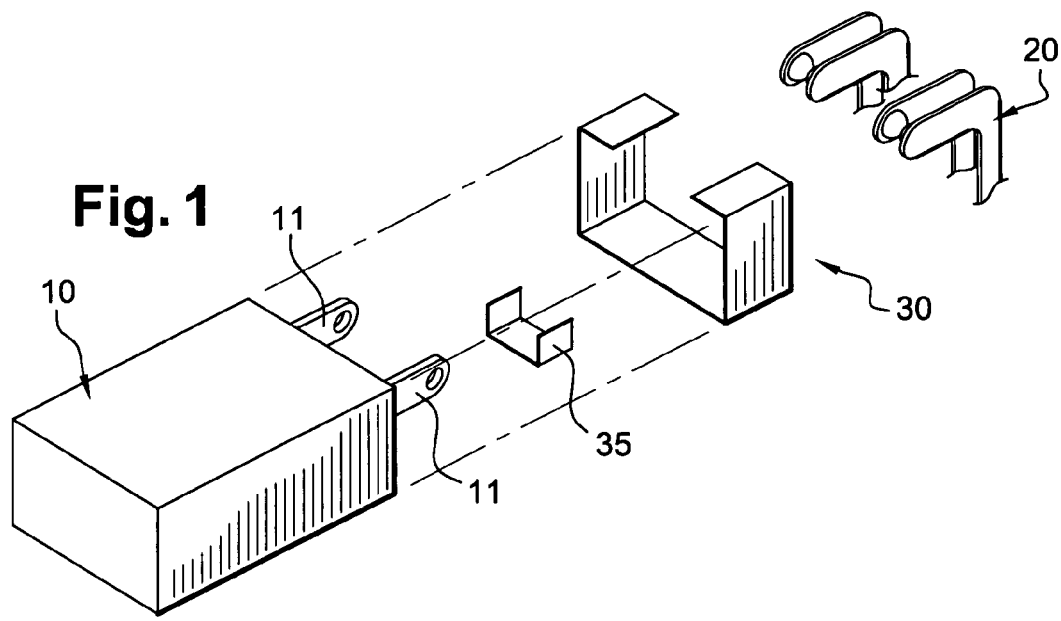
FIG. 1 illustrates an exploded schematic view of an overcurrent protection device to be fitted to a commutator housing according to the invention.

FIG. 1 shows two Lyre-shaped connectors 20. The Lyre-shaped connectors 20 each have a characteristic shape with two sprung conductive rods connected together at one of their ends to form a clamp. The electrical connection pins 11 of the electrical overcurrent protection device 10 can thus each be inserted and positively retained between two rods 21 and held by the clamp, which also ensures the electrical contact. Lyre-shaped connectors are commercially available.

FIG. 1 also shows a lateral-retainer member or retainer housing 30 designed to wrap around the overcurrent protection device 10 for precise lateral positioning on the commutator housing. The retainer housing 30 is preferably made of an insulating material, such as plastic. It can optionally be in one piece with the commutator housing support.

FIG. 1 also shows a retaining stop member 35 designed to retain the overcurrent protection device 10 in the axis of the Lyre-shaped connectors 20. The retaining stop member 35 can be in one piece with the commutator housing support and prevents any disengagement of the electrical connection pins 11 from the Lyre-shaped connectors 20. The commutator housing support is sufficiently flexible to allow the overcurrent protection device 10 to be released from the hold of the retaining stop member 35.

Figure 2:
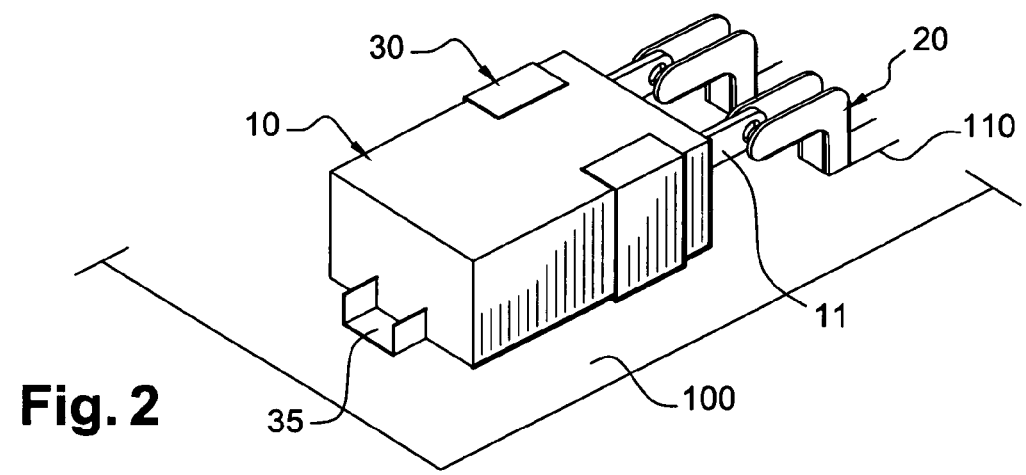
FIG. 2 illustrates an assembled schematic view of FIG. 1.

FIG. 2 illustrates the commutator housing with the overcurrent protection device 10 fitted. The commutator housing includes a support 100, for example made of plastic. Conductive tracks 110 made of laminated copper, for example, provide electrical connection and are arranged on the support 100. The support 100 can be a printed circuit board that also includes components, such as sensors, microprocessors, memory chips, etc. The conductive tracks 110 are designed to electrically connect a power supply connector (not illustrated) to brush holders (not illustrated). At least one of the conductive tracks 110 is broken, and the two Lyre-shaped connectors 20 are placed, respectively, at each end of the break in conductive track 110. The Lyre-shaped connectors 20 are attached to the conductive track 110 by soldering, preferably performed by the supplier of the commutator housing. The Lyre-shaped connectors 20 thus replace the tabs onto which the overcurrent protection device had to be soldered in the commutator housings of the prior art. The overcurrent protection device 10 is then inserted between the two Lyre-shaped connectors 20. The continuity of electrical current flow is therefore ensured by the overcurrent protection device 10, which conducts the current while ensuring heat dissipation proportional to the intensity of the current.

The overcurrent protection device 10 is precisely positioned in relation to the Lyre-shaped connectors 20 by the lateral-retainer housing 30, which is integral with the support 100 of the commutator housing. The overcurrent protection device 10 is also held in position with the electrical connection pins 11 inserted into the Lyre-shaped connectors 20 due to the retaining stop member 35, which is integral with the support 100 of the commutator housing. The overcurrent protection device 10 is therefore in an optimum position on the support 100 to facilitate the connection of the first and second electrical connection pins 11, respectively, into each of the Lyre-shaped connectors 20.

Figure 3:
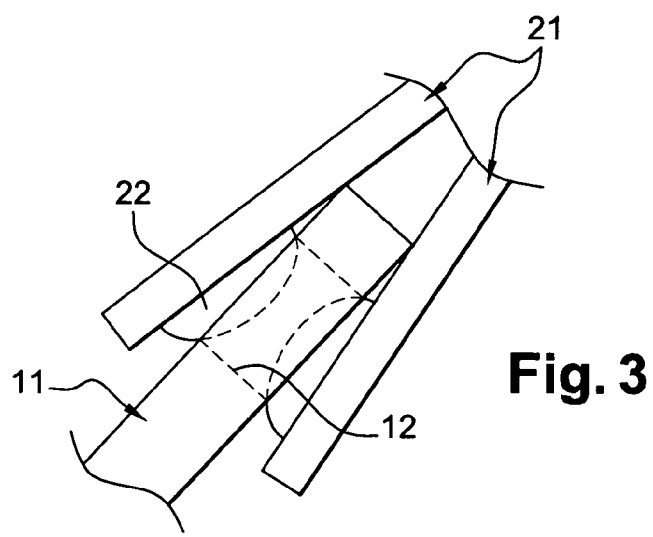
FIG. 3 illustrates a detailed schematic view of fitting an electrical connection pin of the overcurrent protection device into a Lyre-shaped connector.

FIG. 3 illustrates in detail the connection of one of the electrical connection pins 11 of the overcurrent protection device 10 to one of the Lyre-shaped connectors 20. The Lyre-shaped connector 20 includes two rods 21 joined at one of their ends to form a base (not illustrated) fixed to the electrical conductive track 110 on the support 100. The rods 21 thus form a clamp. Free ends of the rods 21 can be provided with raised buttons or lugs 22 capable of entering cavities 12 provided on each of the electrical connection pins 11 of the overcurrent protection device 10. The cavities 12 may be a through-hole at the end of the electrical connection pin 11 of the overcurrent protection device 10. The lugs 22 cooperate with the cavities 12 to ensure that the electrical connection pin 11 is firmly clamped between the rods 21 of the Lyre-shaped connector 20.

The commutator housing according to the invention can be produced in the following way. A commutator housing support is provided, with or without pre-mounted brushes to make contact with the commutator. The supplier of the commutator housing creates conductive tracks 110 which provide electrical connection on the support 100, particularly between the brush holders soldered to the conductive tracks 110 and the fitting points for a power supply connector onto which a wiring harness will be connected to run the direct-current motor. According to the invention, two Lyre-shaped connectors 20 are already soldered onto at least one electrical conductive track 110. With such a commutator housing, the motor fitter can fit an overcurrent protection device 10 by inserting the electrical connection pins 11 into the Lyre-shaped connectors 20. The overcurrent protection device 10 is thus fitted without soldering. The commutator housing can then be assembled in a motor for operating a component of an automobile vehicle, for example.

Of course, the present invention is not limited to the embodiments described by way of example. Thus, several overcurrent protection devices can be fitted in series on the same electrical connection track and/or overcurrent protection devices can be fitted on several conductive tracks providing electrical connection or on all of them.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A commutator housing for a direct-current motor comprising:
    conductive tracks providing electrical connection;
    a first Lyre-shaped connector and a second Lyre-shaped connector; and
    an overcurrent protection device first electrical connection pin and a second electrical connection pin, wherein at least one of the conductive tracks is a broken conductive track including a break, and each of the first Lyre-shaped connector and the second Lyre-shaped connector is inserted respectively at one end of the break in the broken conductive track;
    wherein the overcurrent protection device is inserted in series in the broken conductive track with the first electrical connection pin clamped into the first Lyre-shaped connector and the second electrical connection pin clamped into the second Lyre-shaped connector.

2. The commutator housing according to claim 1, wherein each of the first electrical connection pin and the second electrical connection pin includes cavities that each receive button portions of one of the first Lyre-shaped connector and the second Lyre-shaped connector.

3. The commutator housing according to claim 2, wherein the cavities are through-holes.

4. The commutator housing according to claim 1, further comprising a retainer member for laterally retaining the overcurrent protection device.

5. The commutator housing according to claim 1, further comprising a retaining stop member to hold the overcurrent protection device in position when the first electrical connection pin and the second electrical connection pin are inserted into the first Lyre-shaped connector and the second Lyre-shaped connector, respectively.

6. The commutator housing according to claim 1, wherein the conductive tracks provide electrical connection and connect brush holders to a power supply connector.

7. The commutator housing according to claim 1, wherein the conductive tracks are arranged on a support.

8. The commutator housing according to claim 7, wherein the support is a printed circuit board.

9. The commutator housing according to claim 1, wherein each of the first Lyre-shaped connector and the second Lyre-shaped connector includes two rods that are joined to form a clamp.

10. The commutator housing according to claim 9, wherein each of the two rods includes a free end provided with a raised surface and the first electrical connection pin and the second electrical pin each includes a cavity, wherein the raised surface of each free end of each of the two rods is capable of entering in the cavity of one of the first electrical connection pin and the second electrical pin.

11. The commutator housing according to claim 1, wherein each of the first Lyre-shaped connector and the second Lyre-shaped connector includes two sprung cantilevered rods.

12. A motor for an openable component of an automobile vehicle including a commutator housing for a direct-current motor, the motor comprising:
    conductive tracks providing electrical connection;
    a first Lyre-shaped connector and a second Lyre-shaped connector; and
    an overcurrent protection device having a first electrical connection pin and a second electrical connection pin, wherein at least one of the conductive tracks is a broken conductive track including a break, and each of the first Lyre-shaped connector and the second Lyre-shaped connector is inserted respectively at one end of the break in the broken conductive track;
    wherein the overcurrent protection device is inserted in series in the broken conductive track with the first electrical connection pin clamped into the first Lyre-shaped connector and the second electrical connection pin clamped into the second Lyre-shaped connector.

13. The motor according to claim 12, wherein the commutator housing includes a support comprising a printed circuit board.

* * * * *

UNITED STATES PATENT AND TRADEMARK OFFICE
CERTIFICATE OF CORRECTION

PATENT NO. : 7,362,020 B2  
APPLICATION NO. : 11/244307  
DATED : April 22, 2008  
INVENTOR(S) : Furlan et al.

It is certified that error appears in the above-identified patent and that said Letters Patent is hereby corrected as shown below:

Claim 1, Column 5, line 22: insert --having a-- after "device" and before "first"

Signed and Sealed this

First Day of July, 2008

JON W. DUDAS  
*Director of the United States Patent and Trademark Office*